United States Patent Office 2,753,241
Patented July 3, 1956

2,753,241

PROCESS OF LAUNDERING USING HTH AND COMPOSITION THEREFOR

James D. MacMahon, Baltimore, Md., assignor to Olin Mathieson Chemical Corporation, a corporation of Virginia No Drawing. Application December 23, 1953,
Serial No. 400,120

3 Claims. (Cl. 8—137)

My invention relates to the production of a stable dry calcium hypochlorite composition which has particular value as a laundry bleach and to improvements in laundry bleaching practice whereby calcium hypochlorite compositions are added as dry products directly to the laundry wash wheel in the presence of soap.

In commercial laundering, most of the goods to be washed are composed of white cotton goods which the laundry operator wishes to deliver in a clean, sterile condition with a high degree of whiteness. To aid in achieving this condition bleaching is employed. In commercial laundry practice, the washing cycle consists of many changes of water, usually about ten. The laundry cycle starts with a "break" in which the clothes are washed in a wheel in an alkaline liquor which may or may not contain soap. After several minutes of washing in this liquor, the wheel is drained and several washings follow with sufficient soap to give detergency. Normally about four such "suds" treatments are employed with the wash, liquor being drained from the wheel after each suds treatment. Bleaching is usually done in the last suds. Following the suds usually about four rinses are employed, followed by a sour and blue operation.

Because of the well-known reaction of calcium salts with soap solutions by which considerable soap is consumed by reaction with the calcium salts to form calcium soaps and because of the resulting troublesome deposits and residues, calcium hyprochlorite as such has not been employed in laundries for bleaching. The addition of a calcium salt, such as calcium hypochlorite, to the soap liquors containing some soap results in precipitation of calcium soaps upon the clothing. This usually shows up in the form of visible soap specks or flecks on the cloth because of the tendency of calcium soaps under some conditions to form insoluble macroscopic curds which suggest dirt and frequently do carry a minor portion of dirt. They are also objectionable in that rancidity may develop from the calcium soaps of the washed cloth if stored for long periods of time. Not all of the calcium soap will appear in the form of specks or flecks, however, but some may be in a molecularly dispersed form, distributed throughout the cloth which when in limited amounts may be unobjectionable. The presence of soap specks or flecks, however, amounting to less than one half a per cent on the dry weight of the cloth, may make the washing treatment unsatisfactory for laundry standards. Frequently, laundry standards require a complete absence of calcium soap deposits in the form of spots.

Because of the difficulties with calcium salts and soap solutions, most laundries employe softened water for washing. As the main objective in softening the water is the prevention of calcium soap formation, the softening is usually considered satisfactory if the calcium and magnesium ions present are substantially removed. Consequently, it has become common practice to employ zeolite or "Permutit" softening systems which remove the greater portion of the calcium and magnesium ions but leave the anions little changed. As most water supplies contain a large portion of the calcium in the form of bicarbonate, the softened water in such processes may contain substantial amounts of carbonates and bicarbonates. For many laundry operations these cause no trouble. The residual amount of calcium ions is not sufficient to give a precipitate of calcium carbonate with the carbonate ions present until the pH of the liquor is raised, as happens when soap and builders are added to the water. In the actual laundry process small amounts of calcium carbonate are formed as a fine suspension and minor portions of this deposit on the cloth. These ordinarily have no detectable or objectionable effect if clothes which have been repeatedly washed in a commercial laundry are analyzed. In some instances more calcium is found present as calcium carbonate than as calcium soaps, though both compositions will normally be below the amount to which objection would be raised.

If, however, calcium hypochlorite is added to such solutions, a turbidity is developed from formation of calcium carbonate salts. These are normally quite finely divided and rinse freely through the cloth with only a small portion retained which is too small to have any noticeable effect. The amount deposited on the cloth is usually substantially the same as that when the bleaching is conducted with sodium hypochlorite solutions. Commercial laundry operators, however, object to the resulting turbidity in the wash liquor. To add to the problem some turbidity is also produced by the formation of molecularly dispersed calcium soaps, which do not deposit on the cloth, depending on such factors as the pH of the solution, builders present, soap concentration, temperature and duration and degree of agitation. Moreover, some turbidity may result from residual soil in suspension.

Because of the above described difficulties with calcium salts, such as calcium hypochlorite, commercial laundries employe dilute sodium hypochlorite solutions for the bleaching operation. The sodium hypochlorite bleach solution is customarily added to the wash wheel in the last of a succession of washing operations or "suds." The addition of the sodium hypochlorite solution is usually fixed at 2 quarts of a one per cent available chlorine solution for each 100 pounds dry weight of wash load in the wheel. Many methods of obtaining the sodium hypochlorite solution are available to laundries. The instability of solid sodium hypochlorite is well known so that no preparation based on this material is commercially available. The sodium hypochlorite solution may be obtained as such in concentrated form in glass carboys but is not stable, thus limiting storage time, and generally must be diluted before being added to the wash wheel to avoid damage to the cloth. More general practice, however, is to prepare a stock solution, usually at a concentration of one per cent available chlorine, from solid calcium hypochlorite by reacting it with soda ash with the simultaneous formation of highly insoluble calcium carbonate:

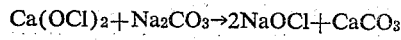

$$Ca(OCl)_2 + Na_2CO_3 \rightarrow 2NaOCl + CaCO_3$$

The precipitated chalk is permitted to settle and then the supernatant liquid is removed by siphoning or otherwise for subsequent use in the wash wheel. The common trade practice has been for the laundry to procure the high test calcium hypochlorite and soda ash as separate items. Recently, a product has been available which provides a suitably proportioned loose dry mixture of calcium hypochlorite and soda ash, containing a desiccant, e. g., quicklime, to inhibit decomposition of the hypochlorite, which permits the preparation of sodium hypochlorite solutions from a single product.

The preparation of sodium hypochlorite solutions in this way, even using the pre-formed dry mixture, however, is objectionable, primarily because of the settling time required and the subsequent nuisance of disposing of the sludge. Although it has been proposed to add the dry mixture, in an equivalent amount of available chlorine, directly to the wash wheel, the procedure has been found infeasible because of excessive soap destruction and disposition of insoluble calcium soaps. The formation of calcium soaps by reaction between the sodium soaps present in the wash wheel and the calcium ions from the quick dissolving calcium hypochlorite (and the relatively slow dissolving calcium hydroxide formed by hydration of the quicklime desiccant) occurs despite the fact that the mixture may contain more than the reactive amount of sodium carbonate required to combine with the total calcium content of the mixture to form highly insoluble calcium carbonate. This can best be explained by the fact that the sodium soaps are already in solution and therefore "grab" or selectively react with a disproportionately high share of the calcium ions to form equally insoluble calcium soaps together with sodium hypochlorite. Hence, when loose mixtures of this type are added directly to the wash wheel an excessive degree of soap destruction is experienced. For example, if such a mixture, containing sodium carbonate 20 per cent in excess of the calcium reactive proportion, is directly added to a hot soap solution (1 gpl soap at 60° C.) to an amount representing a dosage quantity of 100 p. p. m. of available chlorine, upwards of 70 per cent of the soap is destroyed.

Although it is ordinarily impractical if not impossible to incorporate enough sequestering agent into a high test calcium hypochlorite composition to sequester its calcium content, I have found that when a small amount of sodium tripolyphosphate, i. e. about 2 to 10 per cent, is added to such compositions, flocculation of calcium insolubles in aqueous solution is prevented and the calcium insolubles are maintained in finely dispersed, colloidal-like suspensions. Although an anti-flocculating effect has been noted before with calcium hypochlorite compositions designed for disinfecting use, these products were never used or thought to be susceptible of use to form solutions in which soap was present or to which it might be added. Surprisingly, I have found that high test hypochlorite compositions which contain about 2 to 10 weight per cent of sodium tripolyphosphate can be employed without deleterious effect in the presence of the limited amounts of soap, e. g. about 100 to 200 p. p. m., normally present in the rinsing cycles of laundry practice. No calcium soap curds are formed which would deposit as undesirable specks or flecks on the cloth. Any calcium soaps that are formed are molecularly dispersed and evenly distributed throughout the cloth and the amount of calcium soap deposited on the cloth appears to be reduced. Moreover, the turbidity due to the formation of calcium carbonate is substantially reduced without having any deleterious effect on the turbidity due to the molecularly dispersed calcium soaps and surprisingly reduces the turbidity due to such soaps. The new compositions are particularly valuable in regions of hard water, for even though it is common laundry practice to apply water softening procedures, carbonates in laundry water usually remain a problem.

The effectiveness of the new compositions then can be visually observed by making up solutions containing several hundred parts of soap. If a bleaching concentration of calcium hypochlorite is added to one solution and a similar concentration with about 2 to 10 per cent sodium tripolyphosphate is added to another solution, a turbid solution results in the first case and a substantially clear solution results in the second case. The phenomenon is not the result of calcium sequestration, however, for if a similar concentration of calcium hypochlorite with an amount of sodium tripolyphosphate substantially in excess of 10 per cent, say about 15 to 20 per cent, is added to soap solution, a turbid solution of undesirable undissolved solids content again results. With such high sodium tripolyphosphate contents, there also may be precipitation of calcium tripolyphosphate which appears to have an undesirable effect in promoting formation of undesirable calcium soap curds. In the preferred range of sodium tripolyphosphate, however, the laundry solutions will be far below the saturation point of calcium tripolyphosphate. The concentration of sodium tripolyphosphate at which precipitation of calcium tripolyphosphate will occur will vary with such factors as the pH of the wash liquor, builders present, temperature and amount of bleach employed but will ordinarily be more than 10 per cent in a 37 to 40 per cent available chlorine mixture.

In applying the new compositions to laundry practice, it is advisable to add the dry composition to one of the subsequent rinses. The second rinsing operation offers particular advantages as the soap concentration at this point is normally somewhere between 100 and 200 p. p. m. Although all the soap is destroyed by the calcium content of the bleach the resulting calcium soap burden is not so excessive as to materially induce an adverse effect on whiteness retention caused by a gradual accumulation of lime soap deposition in the interstices of the fabrics. I do not propose to explain the mechanism responsible for the phenomenon but the apparent effect of the presence of even minor proportions of the tripolyphosphate is that of reducing the size of the micelles of the calcium soap to a degree where they either remain in relatively stable suspension or are even so comparatively small in size as to be virtually unfilterable with respect to the wash load.

In addition to the advantageous reduction in turbidity due to formation of calcium carbonate, the turbidity due to molecularly dispersed calcium soaps is also reduced by as much as 5 to 10 per cent when the compositions are added to the rinse solutions in which the limited amounts of soap are present. With more concentrated soap solutions, however, the presence of the sodium tripolyphosphate tends to retard the formation of calcium soap curds and results in increased turbidity from molecularly dispersed soaps.

The proportion of high test calcium hypochlorite in the compositions may approximate 40 to 95 weight per cent but advantageously for laundry bleaches approximates 40 to about 65 weight per cent. The proportion of sodium tripolyphosphate is about 2 to 10 weight per cent. Preferably, about 2 to 5 weight per cent of sodium tripolyphosphate is used in a 37 to 40 per cent available chlorine mixture, for example. In order to stabilize the high test calcium hypochlorite-soda ash-polyphosphate compositions, about 4 to 10 weight per cent quicklime or calcium oxide is incorporated. The balance of the composition usually comprises about 15 to 54 per cent soda ash or sodium chloride.

In addition to the primary components and sodium chloride, the new products may contain other compatible ingredients such as sodium silicate, sodium bicarbonate and the like. Also, it may be desirable to incorporate a detergent of the synthetic organic type, or additives such as CMC (carboxymethyl cellulose) in order to facilitate rinsing or to add to the effectiveness of the compositions.

In the manufacture of the new compositions, preferably a stable high test calcium hypochlorite is employed which is high in available chlorine and low in lime and calcium chloride. A preferred calcium hypochlorite product is prepared as described in U. S. Patent 1,787,048 and is particularly useful. Characteristically, a commercial product of this type contains about 70 per cent available chlorine. The calcium hypochlorite may be finely divided but to minimize dustiness in handling while providing a rapid rate of solubility in the wash wheel, the particle sizing commercially obtained by passing calcium hypochlorite through about a 30-mesh screen with retention on about a 60-mesh screen is particularly advantageous. Dense granular soda ash having a screen analysis approximating that of the calcium hypochlorite is employed with advantage, but to facilitate rate of solubility the tripolyphosphate should preferably be in powdered form.

In use the compositions are most advantageously employed by addition to the second rinse in the usual commercial laundry cycle. At this point, the wash water characteristically contains up to about 200 parts per million of soap and I have found that this proportion of soap, without deleterious effect on the washing operation, will take up an equivalent amount of the calcium present in the bleach composition. A useful formulation may be based upon the use of a proportionate reduction in soda ash content from that necessary to react with all of the calcium which will be released in aqueous solution. For example, typical compositions may contain about 40 to 65 per cent high test calcium hypochlorite, about 15 to 30 per cent soda ash (assuming that the excess soap laundry rinse system will account for about 40 per cent of the calcium to be reacted), about 2 to 10 per cent of sodium tripolyphosphate and about 4 to 10 per cent of calcium oxide. Enough calcium oxide is used to take up all of the water in the mixture, which preferably should be restricted in the total composition to 1 per cent or less, and to provide for the expected period of storage and conditions of use. The quicklime is pulverized to a finely divided state and preferably should contain a calcium oxide content of not less than about 93 per cent.

As noted above, light or dense soda ash may be used, but it should contain less than about 2 per cent of water and preferably should contain less than 1 per cent or be substantially anhydrous. Since soda ash is hygroscopic, improperly stored material may contain larger amounts of water which render it unsuitable for the present compositions. In particle size, the soda ash preferably should be equivalent to that of the calcium hypochlorite.

The order of mixing the components is immaterial except that it is desirable to add the hypochlorite last. Thus all of the components except the hypochlorite may be thoroughly mixed and after any heat evolved through desiccation is dissipated, the calcium hypochlorite is incorporated. Most advantageously, the premixed compositions are formed into hard, dense pellets or tablets in conventional pressure tableting equipment. The form of the finished compositions may be small pills or pellets or the compositions may be formed into large tablets or cakes which then are granulated by breaking into granular particles which are screened to desired size range, e. g. upwards of 5-mesh size.

The compositions of my invention and their utility will be further illustrated by the following examples.

*Example I*

To determine the effect of sodium tripolyphosphate on turbidity due to molecularly dispersed calcium soaps, two calcium hypochlorite compositions were prepared. Both contained 38 per cent available chlorine derived from "HTH," a commercial high test calcium hypochlorite, and 3 per cent calcium oxide as a protective desiccant. One mix contained 3 per cent sodium tripolyphosphate and the other contained no sodium tripolyphosphate (plain mix).

Sufficient amounts of each mix were added in dry form to give 50 p. p. m. in various liquids. After 2½ minutes of mild stirring at 65° C., a sample was measured for light transmission on a Fischer photometer. The lower the reading, the more turbid the sample. All the tests were run with identical conditions of stirring, volume, temperature and time. The results were as follows:

| Liquid Tested | Light Transmission, Percent |
| --- | --- |
| Distilled water, (standard) | 100 |
| Same plus plain mix | 96.5 |
| Same plus sodium tripolyphosphate mix | 97.0 |
| Distilled water plus 100 p. p. m. soap and 50 p. p. m. sodium silicate | |
| Same plus plain mix | 67 |
| Same plus sodium tripolyphosphate mix | 76 |
| Soft water (Permutit) from a commercial laundry | 98.3 |
| Same plus plain mix | 84.5 |
| Same plus sodium tripolyphosphate mix | 89.5 |
| Soft water plus 100 p. p. m. soap and 50 p. p. m. sodium silicate | |
| Same plus plain mix | 29.5 |
| Same plus sodium tripolyphosphate mix | 44 |
| Actual commercial laundry second rinse water, before addition of bleach | 40.5 |
| Same plus plain mix | 31.5 |
| Same plus sodium tripolyphosphate mix | 37.0 |

Similar experiments were made with other concentrations. In general, the light transmission of the solutions made from the sodium tripolyphosphate mix increased from about 5 to 15 per cent over the solutions made from the plain mix. With actual laundry rinse water, the light transmission will vary from about 30 per cent with heavily soiled clothes to about 70 per cent with very lightly soiled materials. The suspended soil in the rinse water has an effect on the molecularly dispersed calcium carbonate, so that the difference in light transmission with a laundry rinse water is not as much as with straight soft water, for example.

The above results indicate the decrease in turbidity and improved appearance of rinse water solutions when calcium hypochlorite preparations containing sodium tripolyphosphate are employed.

Representative examples of useful products formulated according to my invention in which varying proportions of calcium hypochlorite have been utilized by incorporation of calcium oxide, soda ash and salt are as follows:

*Example II*

An effective composition according to the present invention contains:

| Component | Percent |
| --- | --- |
| High test calcium hypochlorite | 44 |
| Soda Ash | 47 |
| Sodium tripolyphosphate | 3 |
| Quicklime | 6 |

*Example III*

Another effective composition according to the present invention contains:

| Component | Percent |
| --- | --- |
| High test Calcium hypochlorite | 40 |
| Soda Ash | 45 |
| Sodium tripolyphosphate | 7 |
| Quicklime | 8 |

*Example IV*

Another effective composition according to the present invention contains:

| Component | Percent |
| --- | --- |
| High test Calcium hypochlorite | 52 |
| Salt | 40 |
| Sodium tripolyphosphate | 3 |
| Calcium oxide | 5 |

Example V

Another effective composition according to the present invention contains:

| Component | Percent |
|---|---|
| High test Calcium hypochlorite | 55 |
| Soda Ash | 36 |
| Sodium tripolyphosphate | 3 |
| Quicklime | 6 |

Example VI

Another effective composition according to the present invention contains:

| Component | Percent |
|---|---|
| High test Calcium hypochlorite | 65 |
| Soda Ash | 23 |
| Sodium tripolyphosphate | 5 |
| Quicklime | 7 |

I claim:

1. In a process of laundering in which the wash load is subjected to a washing cycle with an aqueous solution of soap followed by a rinsing cycle consisting of a plurality of rinsing steps, the method of bleaching the wash load in the presence of soap which comprises adding a dry bleaching composition consisting essentially of a high-test calcium hypochlorite and about 2 to 10 weight per cent of sodium tripolyphosphate during a rinsing step, other than the first rinse, in which the soap concentration is not more than about 200 p. p. m. prior to the final rinse.

2. A dry bleaching composition for use in dry form in commercial laundry practice which consists essentially of a high-test calcium hypochlorite and about 2 to 10 weight per cent of sodium tripolyphosphate.

3. In a process of laundering in which the wash load is subjected to a washing cycle with an aqueous solution of soap followed by a rinsing cycle consisting of a plurality of rinsing steps, the method of bleaching the wash load in the presence of soap which comprises adding a bleaching composition consisting essentially of a high-test calcium hypochlorite and about 2 to 10 weight per cent of sodium tripolyphosphate during the second rinsing step in which the soap concentration is not more than about 200 p. p. m.

References Cited in the file of this patent

UNITED STATES PATENTS

| | | |
|---|---|---|
| 98,387 | Jeanning | Dec. 28, 1869 |
| 1,515,647 | Airheart | Nov. 18, 1924 |
| 1,777,858 | Phair | Oct. 7, 1930 |
| 1,961,606 | Ells | June 5, 1934 |
| 2,166,362 | MacMahon | July 18, 1939 |
| 2,166,363 | MacMahon | July 18, 1939 |
| 2,319,697 | MacMahon | May 18, 1943 |

OTHER REFERENCES

Procter & Gamble Co., "The Washroom," 1927, pages 74 and 75.

Victor, Ind. & Eng. Chem., November 1951, page 5A.